United States Patent [19]

Grynberg et al.

[11] Patent Number: 4,466,288

[45] Date of Patent: Aug. 21, 1984

[54] APPARATUS FOR SENSING AND LOCATING VIBRATIONS

[75] Inventors: Ami Grynberg, Neve Monoson; Abraham Perlstein; Edward Gliksman, both of Tel Aviv, all of Israel

[73] Assignee: Israel Aircraft Industries Ltd., Ben Gurion Airport, Israel

[21] Appl. No.: 318,562

[22] Filed: Nov. 5, 1981

[30] Foreign Application Priority Data

Nov. 9, 1980 [IL] Israel .................................. 61438

[51] Int. Cl.³ .................................................. G01H 1/00
[52] U.S. Cl. ...................................... 73/654; 340/566; 200/61.47; 73/516 LM
[58] Field of Search ................... 73/652, 654, 516 LM; 340/566; 364/508, 65, 566; 200/61.47

[56] References Cited

U.S. PATENT DOCUMENTS

| 1,230,787 | 6/1917 | Robison et al. | 340/65 |
| 2,161,411 | 6/1939 | Erich | 200/61.47 |
| 4,334,218 | 6/1982 | Kun | 200/61.47 X |

FOREIGN PATENT DOCUMENTS

| 933495 | 8/1963 | United Kingdom . |
| 934963 | 8/1963 | United Kingdom . |
| 940415 | 10/1963 | United Kingdom . |

Primary Examiner—James J. Gill
Attorney, Agent, or Firm—Cushman, Darby & Cushman

[57] ABSTRACT

A protective system employing vibration sensors for indicating the location of a vibration or of tampering with the system. There is employed a vibration sensor comprising first apparatus operative when the sensor is oriented in a first range of orientations for providing a momentary first impedance condition in response to vibration of at least a predetermined strength and second apparatus operative when the sensor is oriented in a second range of orientations for providing a steady state second impedance condition.

13 Claims, 9 Drawing Figures

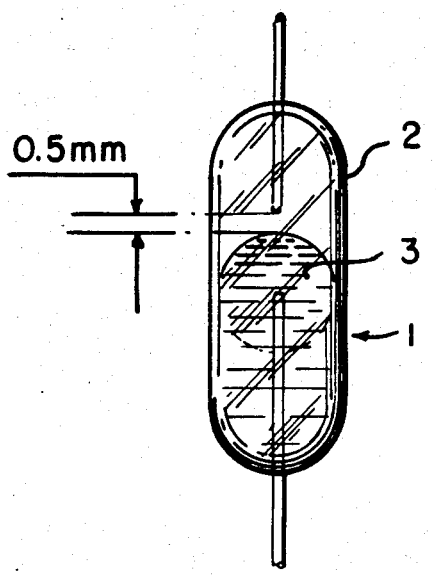
F I G. 1
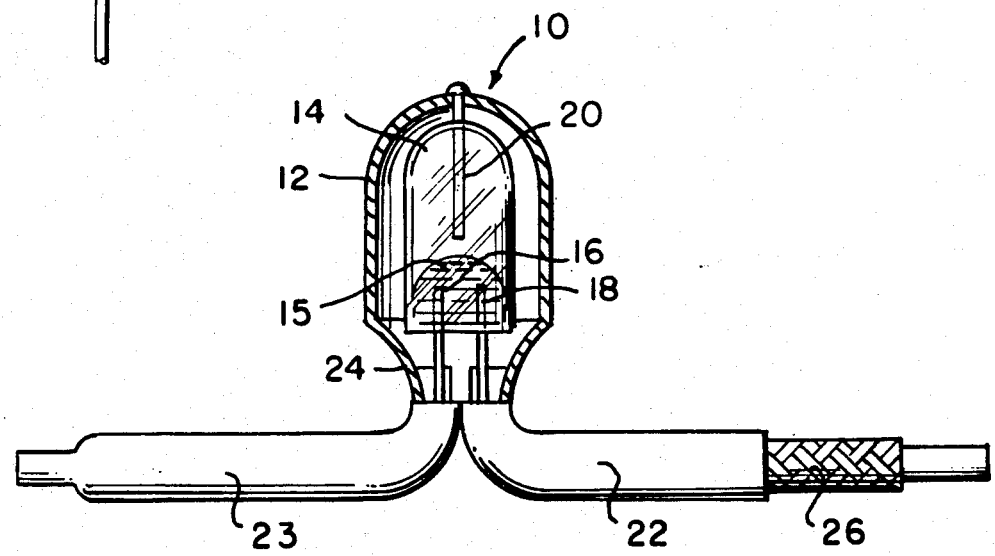
F I G. 2
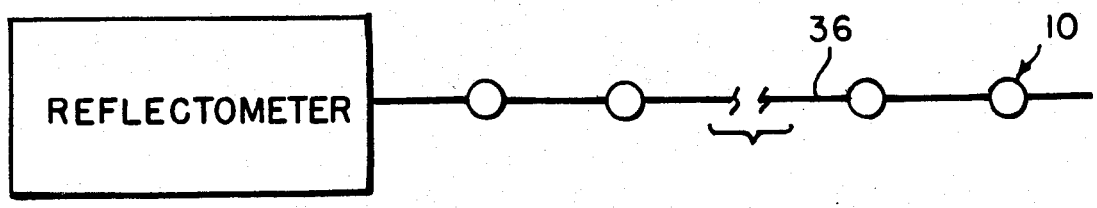
F I G. 3

APPARATUS FOR SENSING AND LOCATING VIBRATIONS

FIELD OF THE INVENTION

The present invention relates to vibration sensing apparatus and more particularly to apparatus for sensing and determining the location of vibrations.

BACKGROUND OF THE INVENTION

Various types of vibration sensors are presently known. These include, for example conductive balls which move under vibration to break a normally closed circuit and various spring loaded vibration sensitive devices. Vibration sensors employing mercury which at rest closes a circuit between two electrodes are also known. The known mercury vibration sensors define two states, at rest, when the circuit is closed and disturbed when the circuit is open.

Vibration sensors of the type described above and protective systems employing such sensors suffer from the significant disadvantage that individual sensors may be disabled, disconnected from the protective system or bypassed without providing a sensible indication to an operation.

Reflectometry is well known for use in locating transmission line faults. A general reference on reflectometry is "Time Domain Reflectometry" HP AN 75, published by Hewlett-Packard Inc., U.S.A. in March, 1966.

SUMMARY OF THE INVENTION

The present invention seeks to provide a vibration sensor which overcomes disadvantages of the prior art vibration sensors described above and to provide a protective system employing vibration sensors which is operative to indicate the location of a vibration or of tampering with the system.

There is thus provided in accordance with an embodiment of the present invention a vibration sensor comprising first apparatus operative when the sensor is oriented in a first range of orientations for providing a momentary first impedance condition in response to vibration of at least a predetermined strength and second apparatus operative when the sensor is oriented in a second range of orientations for providing a steady state second impedance condition.

Further in accordance with the present invention, the sensor provides a third impedance condition when oriented in the first range of orientations at rest.

Additionally in accordance with the present invention, the first and second impedance conditions may be identical.

In accordance with a preferred embodiment of the invention, the vibration sensor comprises a housing, first and second electrodes located within the housing and a liquid conductor disposed within the housing, the first and second electrodes and the liquid conductor being arranged such that when the housing is in a first range of orientations at rest, the first and second electrodes are in electrical non-conducting relationship; when vibrations of predetermined strength are applied to the sensor in the first range of orientations a momentary electrical contact is formed between the first and second electrodes and when the housing is in a second range of orientations a steady state electrical connection is formed between the first and second electrodes.

In accordance with this embodiment, the liquid conductor is arranged to fill more than half of the housing.

There is also provided in accordance with an embodiment of the present invention a vibration sensor comprising a housing, first and second electrodes located within the housing, a liquid conductor disposed within the housing and arranged to normally close an electrical circuit between the first and second electrodes when the housing is in a first range of orientations, a third electrode disposed within the housing and arranged to lie in electrical non-conducting relationship with the liquid conductor when the housing is in the first range of orientations at rest and to define an electrical connection with the liquid conductor when the housing is disturbed, the first, second and third electrodes and the liquid conductor being arranged such that when the housing is in a second orientation, the first and second electrodes are insulated from each other.

Further in accordance with an embodiment of the present invention the first and second electrodes are each coupled to an internal lead of a coaxial cable and the third electrode is coupled to the cable shield.

Additionally in accordance with an embodiment of the present invention the sensor is constructed and connected to the coaxial cable so as to be impedance matched therewith.

Additionally in accordance with an embodiment of the invention there is provided vibration sensing and locating apparatus comprising an extended transmission line, a plurality of vibration sensors connected to the transmission line and distributed therealong, apparatus for transmitting signals along the transmission line, apparatus for receiving signals reflected along the transmission line by the vibration sensors when disturbed, and apparatus for sensing the elapsed time between transmission and receipt of signals for determining the location of a disturbed vibration sensor.

Further in accordance with an embodiment of the invention the sensors are impedance matched with the transmission line so as to enable sensing of an indication of tampering or attempted bypass thereof. According to a preferred embodiment of the invention, the transmission line is a coaxial cable and the sensor is a sensor of the type described hereinabove having three electrodes.

Additionally in accordance with an embodiment of the invention the apparatus for sensing the elapsed time includes sensitivity and resolution enhancement apparatus which periodically samples the background received signal in the absence of a reflected signal, records the sampled received signal and compares it with currently received signals for distinguishing background signals from alarm indicating signals.

Further in accordance with an embodiment of the invention the sensitivity and resolution enhancement apparatus also includes apparatus for precisely determining the onset of a reflected open circuit or vibration indicating signal by comparing the recorded sampled background signal with the current received signal in advance of the peak of the reflected vibration indicating signal.

In accordance with a preferred embodiment of the invention, the first range of orientations includes a range of about 35° in either direction from the vertical in which the sensor displays its desired sensitivity due to the particular surface tension characteristics of mercury when used as the liquid conductor. The second orientation is outside the first range of orientations. When the sensor is located in the second orientation, a steady-state signal is provided indicating that an attempt has been made to neutralize the sensor by reversing its orientation. The provision of a steady-state signal when the sensor is in a second orientation is particularly desirable when the sensor is used with reflectometry apparatus which requires a plurality of momentary indications for providing an alarm output. Were it not for the steady-state signal, a sensor might be disabled by turning it upside down sufficiently quickly so as not to provide the required number of momentary indications for an alarm output.

In accordance with an alternative embodiment of the invention a sensor may be provided with electrode means in place of the first and second electrodes and does not provide an open circuit signal in the case of attempted neutralization thereof by reversing its orientation.

BRIEF DESCRIPTION OF THE DRAWINGS

The present invention will be more fully understood and appreciated from the following detailed description taken in conjunction with the drawings in which:

FIG. 1 is a side view illustration of a vibration sensor constructed and operative in accordance with a preferred embodiment of the present invention;

FIG. 2 is a partially sectional side view illustration of a vibration sensor constructed and operative in accordance with a second preferred embodiment of the present invention;

FIG. 3 is a pictorial illustration of a plurality of vibration sensors arranged along a conductor line;

Figure 4:
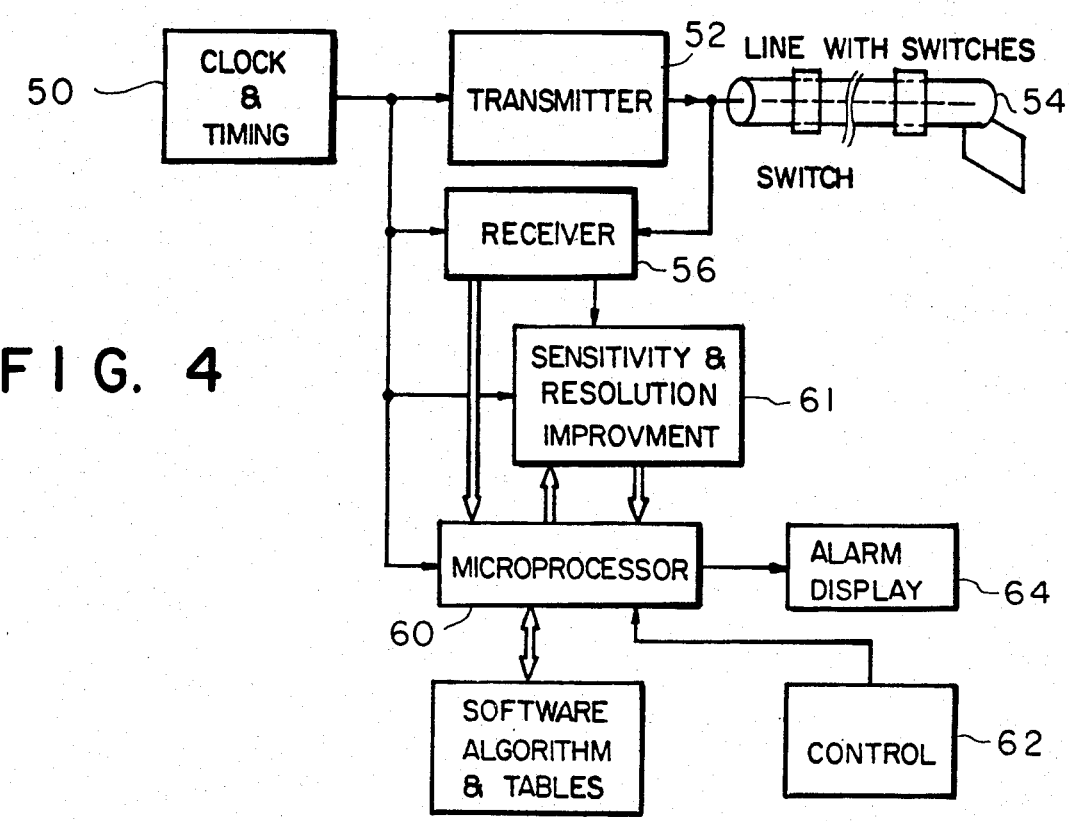
FIG. 4 is a block diagram illustration of vibration sensing and locating apparatus constructed and operative in accordance with an embodiment of the present invention.

Reference is now made to FIG. 1 which illustrates a vibration sensor constructed and operative in accordance with a preferred embodiment of the present invention. The vibration sensor, indicated generally by reference numeral 1 comprises a housing typically formed of glass and indicated by reference numeral 2 and which contains a quantity of mercury or other suitable liquid conductor 3 which fills more than one half of the volume of the housing.

First and second electrodes 4 and 5 extend into the interior of the housing 2 at the extreme ends thereof. According to the illustrated embodiment, the first electrode extends into the interior of the housing 2 by an amount such that when the housing is vertically oriented as illustrated in FIG. 1 with the second electrode lying below the first electrode, the meniscus of the liquid conductor 3 is separated therefrom by a predetermined distance, here 0.5 mm, in order to provide a desired response to vibrations of at least a predetermined strength, with the sensor in this first orientation.

The second electrode extends into the interior of the housing 2 by an amount such that when the housing is vertically oriented in a second orientation opposite to that illustrated in FIG. 1, i.e. with the first electrode lying below the second electrode, the liquid conductor contacts both the first and second electrode, thus providing a steady state closed circuit signal.

It is appreciated that the configuration of the housing is such that in fact the first and second orientations define ranges of orientations which extend about 35° to either side of the vertical and provide substantially the same performance as the vertical orientations.

It is a particular feature of the present invention that the sensor of FIG. 1, when in the first orientation range provides a momentary first impedance condition in response to vibrations of at least a predetermined strength, and when in a second orientation range, as the result of tampering, provides a steady state second impedance condition. The first and second impedance conditions may be identical but differ from the impedance condition of the sensor in the first orientation range in the absence of vibrations.

Reference is now made to FIG. 2 which illustrates a vibration sensor constructed and operative in accordance with a preferred embodiment of the invention. The vibration sensor, indicated generally by reference numeral 10, comprises a housing 12, typically formed of brass. Disposed within housing 12 is a sealed glass ampoule 14 containing a quantity of mercury or other suitable liquid conductor 15.

Extending through the walls of ampoule 14 and into the interior thereof are first, second and third electrodes 16, 18 and 20. Electrodes 16 and 18 are arranged in generally parallel upstanding orientation at the lower part of the ampoule. A quantity of mercury 15 is provided in the ampoule which is sufficient to completely cover the first and second electrodes. Third electrode 20 extends downwardly from the top of the ampoule towards the first and second electrodes 16 and 18 and generally parallel thereto and is axially spaced from the mercury 15 by a minimum of about 0.5 mm. to provide desired sensitivity. Alternatively any other suitable separation may be employed depending on the application.

The first and second electrodes are coupled at the base of housing 12 to respective internal leads of coaxial cables 22 and 23 and are surrounded by suitable cable shields 24. Coaxial cables 22 and 23 are typically of the RG type. The shielding 26 of coaxial cables 22 and 23 is coupled to the housing 12.

It is a particular feature of the present invention that the connection of the coaxial cables 22 and 23 to the sensor 10 provides impedance matching therebetween. As a result of this impedance matching, attempts to tamper with or bypass the sensor result in a sensible impedance mismatch, which, as will be described hereinabove, can be detected to provide an alarm indication.

The provision of a metallic housing 12 provides electromagnetic shielding of the sensor and thus enhances its signal-noise performance.

It is a particular feature of the present invention that the sensor provides acceptable detection characteristics within a first range of orientations extending about 35° to either side from the vertical orientation illustrated in FIG. 2. Therefore the orientation of the sensor need not be determined with particular precision during installation, with considerable savings in installation expense.

The operation of the sensor described hereinabove will now be described briefly. When the sensor is at rest in its first range of orientations as illustrated in FIG. 2, a closed circuit is provided between the internal leads of coaxial cables 22 and 23 by means of the mercury connection between electrodes 16 and 18. When the sensor is disturbed by vibrations of predetermined strength, movement of the mercury 15 causes at least a momentary electrical connection between the internal leads of coaxial cables 22 and 23 and the coaxial cable shielding 26, via third electrode 20.

When the sensor is turned upside down or to one of a range of orientations collectively referred to as a second orientation, lying outside of the first range of orientations, in an attempt to neutralize the sensor, the flow of mercury 15 breaks the electrical connection between the first and second electrodes 16 and 18 and thus between the respective internal leads of coaxial cables 22 and 23. It may thus be appreciated that the sensor provides a differing electrical response in each of the above types of events.

According to an alternative embodiment of the invention, the first and second electrodes may be replaced by electrode means which do not provide an open circuit indication in the second orientation.

Referring now to FIG. 3 there is seen an arrangement of a plurality of sensors 10 arranged in series along a coaxial cable line 36. According to a preferred embodiment of the invention each of the coaxial cable lines is separate and may extend one or more miles. Sensors 10 are connected in series onto the coaxial cable lines in the manner illustrated in FIG. 2 and are evenly distributed therealong and separated by a predetermined distance of about 1-1.5 meters from each other. Alternatively, the sensors need not necessarily be separated by a uniform distance.

According to the invention the coaxial cable lines may be mounted on physical barriers such as walls or fences, on windows or underground or in any other desired mounting environment.

As will be described hereinafter in detail, each coaxial cable line with associated sensors is coupled at one end to reflectometry apparatus and is short circuited at its opposite end in accordance with an embodiment of the invention. The reflectometry apparatus is operative for transmitting pulses along each coaxial cable line and for sensing signals reflected back therealong. The configuration of the reflected signal is indicative of the type of event taking place and the elapsed time before the signal is received is indicative of the location of the event along the cable line.

Figure 5A:
FIGS. 5A, 5B and 5C are waveform diagrams which illustrate the waveform characteristics of the transmitted pulse and reflected pulses in response to different types of events.
Figure 5B:
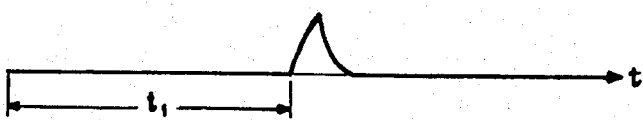
Figure 5C:
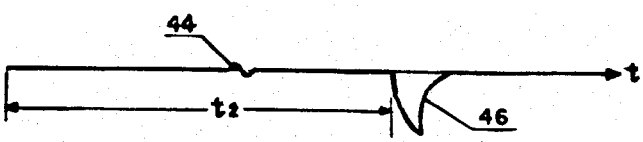

Configurations of the transmitted pulse and reflected signals for various types of events are illustrated in FIGS. 5A, 5B and 5C. FIG. 5A illustrates a typical transmitted pulse which has a pulse width of 1 μsec and a rise time no greater than 20 nsec. FIG. 5B illustrates a reflected signal from an open circuit, as would occur if the cable were cut or if the sensor were reoriented such that the electrical connection between the first and second electrodes 16 and 18 were broken. FIG. 5C illustrates two types of reflected signals. The first, indicated by reference numeral 44 is a bi-phase signal of relatively low amplitude which indicates an impedance mismatch along the line. Such a mismatch would occur as the result of an attempt to tamper with the line or to bypass a portion thereof. The second illustrated reflected signal, indicated by reference numeral 46 is produced by a short circuit along the line, as would be produced by a disturbance at a sensor causing an electrical connection to be made between the first and third electrodes 16 and 20.

It is noted that the reflected open circuit and short circuit signals are of respective opposite polarities and are distorted. Apparatus for compensating for this distortion and for determining the onset of the reflected pulse with precision will be described hereinafter.

Reference is now made to FIG. 4 which is a block diagram illustration of vibration sensing and locating apparatus constructed and operative in accordance with an embodiment of the present invention. The apparatus comprises clock and timing circuitry 50 of conventional construction which provides predetermined shaped pulses of the type described hereinabove to a transmitter 52 which transmits them along a coaxial cable line 54 having connected therealong in series a plurality of sensors, such as vibration sensors 10. It is noted that although sensors 10 as described hereinabove are believed to be best suited for the particular application described herein, alternatively other types of sensors may be employed as suitable.

A receiver 56 is coupled to the coaxial cable line 54 for receiving reflected signals therealong and also receives timing signals from the clock and timing circuitry 50 for establishing a time basis for determining the elapsed time between transmission and signal detection. The receiver provides an output containing received signal information to a CPU 60 such as a microprocessor and additionally to sensitivity and resolution improvement circuitry 61 which is operative to provide an output to the CPU 60. Circuitry 61 also receives an input from clock and timing circuitry 50 as does the CPU.

CPU 60 is operative on the basis of the information received from the receiver and from the improvement circuitry 61 and on the basis of predetermined algorithms and tables which correlate the elapsed time to signal receipt with position along the line and take into account various other known characteristics of the reflected signals in the application environment. A control panel with operator controls 62 is also coupled to the CPU. The CPU provides an alarm signal to alarm display and indication apparatus 64 when the characteristics of the reflected signal indicate an alarm event. Apparatus 64 is operative to indicate the type of event, the time of its occurrence and the location thereof along the line to an accuracy of a few meters. Recording apparatus may be provided for producing a permanent record of events.

Figure 6:
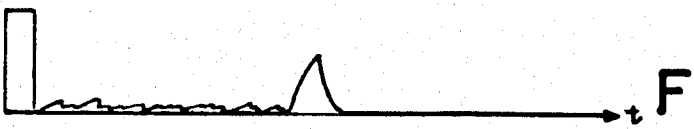
FIG. 6 is a waveform diagram illustrating typical actual reflected waveform background characteristics.

Reference is now made to FIG. 6 which is a waveform diagram illustrating a typical actual reflected waveform which changes slowly over time and constitutes a background against which the event indicating reflected signals must be detected. It is noted that the background waveform may have an amplitude which is in excess of the amplitude of the biphase signal indicating impedance mismatch and attempted tampering or bypass. Furthermore the presence of the background makes it difficult to determine the onset of a received reflected pulse with precision, which precision is required in order to precisely determine the location of the event.

It is a particular feature of the present invention that circuitry is provided for compensating for the background. This compensating circuitry operates by periodically sampling the background, which changes relatively slowly over time, and storing the samples. The current received signal waveform is compared with the stored samples for effecting cancellation of the non-event indicating background. Thus the event indicating signals and the precise onset thereof can be determined with requisite accuracy.

Figure 7:
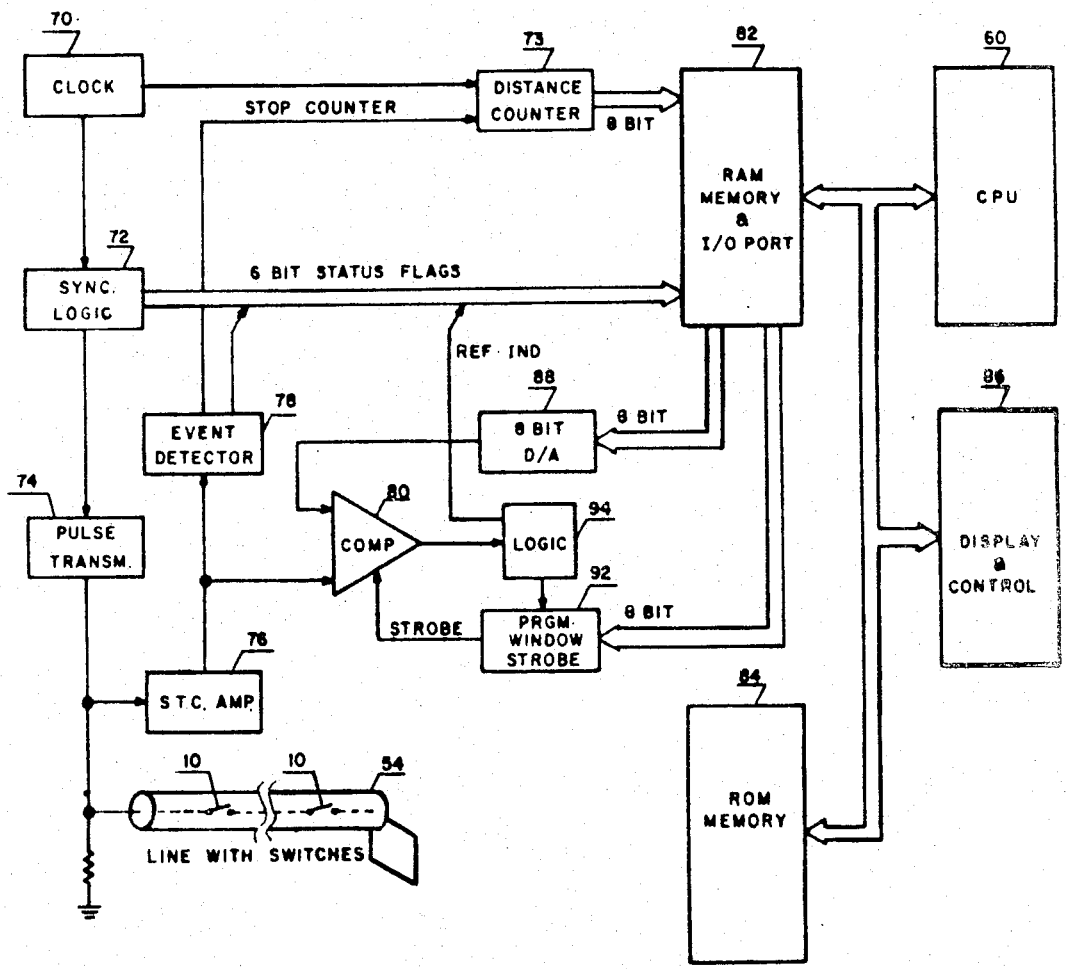
FIG. 7 is a detailed block diagram of the circuitry of FIG. 4.

Reference is made to FIG. 7 which is a detailed block diagram of the circuitry of FIG. 4 and which illustrates the compensation circuitry described above. A central clock 70 provides timing pulses to synchronization logic 72 and to a distance counter 73. The synchronization logic 72 provides suitable timing pulses for pulse transmission circuitry 74 which transmits pulses having desired characteristics as described hereinabove along a coaxial line 54 having a plurality of sensors, such as sensors 10, connected therealong in series.

Reflected signals received from coaxial cable line 54 are amplified by a sensitivity time control amplifier 76 typically comprising CA3028, LM118 and LM741 chips. The amplifier 76 is operative to increase the amplification as a function of elapsed time from signal transmission in order to compensate for transmission losses. The amplified output from amplifier 76 is supplied to an event detector 78 and to a comparator 80 which are typically embodied in an LM161 chip.

The output of the event detector is supplied as a STOP COUNTER input to distance counter 73 and indicates that predetermined criteria for one of the events described hereinabove, indicated by either a break in the circuit or a short circuit along the line, have been met. The type of event, i.e. short circuit or open circuit, indicated is transmitted to a RAM memory and I/O Port 82 via six bit status flags.

In response to receipt of the STOP COUNTER input, the distance counter 73 provides its count to the CPU 60. The count from counter 73 provides an address in the RAM Memory 82 representing a location along the line where the event occurrence. The synchronization logic circuitry 72 provides 6 bit status flags to the I/O Port and RAM Memory 82 for sequencing the memory locations. The RAM Memory and I/O Port 82 is typically embodied in 8155 and 2114AL chips.

The sensitivity and resolution improvement circuitry 61 described hereinabove in connection with FIG. 4 comprises the RAM Memory and I/O Port 82 which interfaces with the CPU 60. RAM Memory 82 is operative to store samples of the received background signal which are updated therein periodically in response to instructions from the CPU. RAM Memory 82 provides an output indicating the stored background signal level via an 8 bit Digital to Analog converter 88 to a first input of a comparator 80. The comparator receives a second input from the output of the S.T.C. amplifier 76 and thus compares the current signal level with the stored background signal level.

The RAM Memory 82 also provides an 8 bit address output to a programmable window strobe circuit 92, typically comprising 74191 chips, which in turn provides a strobe signal to comparator 80. The output from comparator 80 is supplied to logic circuitry 94, typically comprising chips of the 74XX family and which provides an enable input to strobe circuit 92. When the current signal level exceeds the stored background signal level by at least a predetermined amount, the logic circuitry provides a REF-IND signal to the RAM Memory 82.

The CPU 60 provides alarm indications to Display and Control Circuitry 86 which also provides manual inputs to the circuitry. A ROM memory 84 provides program storage for the CPU 60.

As mentioned above, the sensitivity and resolution improvement circuitry operates in two modes. In the first mode, it stores samples of the background received signal and is periodically updated and sequentially compares the samples with the received signal in order to enable detection of low amplitude events indicating signals such as the bi-phase signal 44 illustrated in FIG. 5C indicating impedance mismatch and attemped bypass.

In the second mode, the detection of an event by the event detector 78 causes the RAM Memory 82 to compare current and stored samples in the time frame just prior to detection of the event by the event detector and in sequential preceding time frames until a time frame is reached in which the current signal does not exceed the stored signal by more than the threshold established by the logic circuitry. At that time frame the REF-IND output does not appear thus indicating to the RAM Memory 82 the precise onset of the event-indicating reflected pulse.

It is noted that since the far end of the line is short circuited, a reflected short circuit signal will normally be expected within a predetermined time. The CPU is programmed to provide an alarm indication in the absence of receipt of such reflected signal.

It will be appreciated by persons skilled in the art that the invention is not limited to what has been particularly shown and described herein. Rather the scope of the invention is defined only by the claims which follow:

We claim:

1. Vibration sensing and locating apparatus comprising:
    an extended electrical conductor;
    a plurality of vibration sensors distributed along said conductor and connected thereto;
    apparatus for transmitting signals along said conductor;
    apparatus for receiving signals reflected along said conductor by said vibration sensors in response to events; and
    apparatus for sensing the elapsed time between the transmission and receipt of signals thereby to determine the location of the vibration sensor responding to an event.

2. Apparatus according to claim 1 and wherein said vibration sensors are impedance matched with said conductor.

3. Apparatus according to claim 1 and wherein said conductor is a coaxial cable.

4. Apparatus according to claim 3 and wherein said vibration sensors comprise first and second electrodes connected in series with said conductor and a third electrode coupled to the shield of said coaxial cable.

5. Apparatus according to claim 1 and also including means for sensing a reflected signal indicating the presence of an impedance mismatch along the conductor indicating tampering with the conductor or attempted bypass of a portion thereof.

6. Apparatus according to claim 1 and wherein said vibration sensors comprise first and second electrodes connected in series with said conductor.

7. Apparatus according to claim 4 and wherein said apparatus for sensing the elapsed time includes sensitivity and resolution enhancement apparatus which periodically samples the background received signal in the absence of an event indicating signal, records the sampled received signal and compares it with currently received signals for distinguishing background from event indicating signals.

8. Apparatus according to claim 7 and wherein said sensitivity and resolution enhancement apparatus includes apparatus for precisely determining the onset of a reflected vibration indicating signal by comparing the recorded sampled background signals with the currently received signal during time frames just prior to detection of said indicating signal by a detector operating at a threshold above the background.

9. Vibration sensing and locating apparatus according to claim 1 and wherein said plurality of vibration sensors each comprise
a housing;
first and second electrodes located within said housing;
a liquid conductor disposed within said housing and arranged to normally close an electrical circuit between said first and second electrodes when said housing is in a first range of orientations, and
a third electrode disposed within said housing and arranged to lie in electrical non-conducting relationship with said liquid conductor when said housing is in said first range of orientations at rest and to define an electrical connection with said liquid conductor and said first electrode when said housing is disturbed;
said first and second electrodes and said liquid conductor being arranged such that when said housing is in a second orientation said liquid conductor does not form an electrical connection between said first and second electrodes.

10. Apparatus according to claim 9 and wherein said second orientation lies outside said first range of orientations.

11. Apparatus according to claim 1 and wherein said vibration sensors are mounted on a physical barrier.

12. A vibration sensor comprising:
a housing;
first and second electrodes located within said housing;
a liquid conductor disposed within said housing and arranged to normally close an electrical circuit between said first and second electrodes when said housing is in a first range of orientations, and
a third electrode disposed within said housing and arranged to lie in electrical non-conducting relationship with said liquid conductor when said housing is in said first range of orientations at rest and to define an electrical connection with said liquid conductor and said first electrode when said housing is disturbed;
said first and second electrodes and said liquid conductor being arranged such that when said housing is in a second orientation said liquid conductor does not form an electrical connection between said first and second electrodes,
said first and second electrodes being connected in series with the internal lead of a coaxial cable and said third electrode is connected to the cable shield.

13. A vibration sensor according to claim 12 and wherein said sensor is impedance matched to said coaxial cable.

* * * * *